(12) United States Patent
Lippert et al.

(10) Patent No.: US 6,312,490 B1
(45) Date of Patent: Nov. 6, 2001

(54) INTERLOCKED FIBER FAIL-SAFE REGENERATOR DEVICE

(75) Inventors: Thomas E. Lippert; Gerald J. Bruck, both of Murrysville; Mary Anne Alvin, Pittsburgh, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/479,788

(22) Filed: Jan. 7, 2000

(51) Int. Cl.[7] .......................... B01D 35/14; B01D 39/12; B01D 29/52

(52) U.S. Cl. .................. 55/482; 55/508; 55/518; 55/523; 55/525

(58) Field of Search .............. 55/508, 518, 523, 55/525, 526, 341.1, 482

(56) References Cited

U.S. PATENT DOCUMENTS

| | | |
|---|---|---|
| 4,976,934 | 12/1990 | Maringer et al. . |
| 5,102,745 | 4/1992 | Tatarchuk et al. . |
| 5,185,019 | 2/1993 | Haldipur et al. . |
| 5,433,771 | 7/1995 | Bachovchin et al. . |
| 5,876,471 | 3/1999 | Lippert et al. . |
| 5,944,859 | 8/1999 | Lippert et al. . |
| 6,152,978 | * 11/2000 | Lundquist ........................ 55/385.1 |

* cited by examiner

Primary Examiner—David A. Simmons
Assistant Examiner—Robert A. Hopkins

(57) ABSTRACT

A fail-safe/regenerator device (68), for use within a filter assembly (60) also containing a main filter element (28), contains a top main support (90), and a bottom main support (82), where a rigid, static bed of needles, fibers or wires (92), having an aspect ratio of 30 to 2000 and having crossover points (94), are effective to trap contacting contaminating particulates permanently, and may have an associated safety filter 99.

16 Claims, 4 Drawing Sheets

INTERLOCKED FIBER FAIL-SAFE REGENERATOR DEVICE

BACKGROUND OF THE INVENTION

Field of the Invention

This invention relates generally to hot-gas cleanup systems for feed gas to turbines; and more particularly, to a filter assembly for such systems that includes an all metal fail-safe/regenerator device, containing high aspect ratio interlocked, intertangled fibers. Use of such fibers provides effective particle capture and eliminates the need for heat transfer surfaces, such as Raschig rings, and coarse/fine mesh screen fail-safe elements. The nested fiber bed is extremely resistant to degradation due to thermal shock and so particularly effective in its regenerator function.

Background Information

Modern industrial methods have resulted in a need for an apparatus that is capable of efficiently filtering high temperature combustion or gasification gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

Also, as a key component in advanced coal- or biomass-based power applications, hot gas filtration systems protect the downstream heat exchanger and gas turbine components from particle fouling and erosion, cleaning the process gas to meet emission requirements. When installed in either pressurized fluidized-bed combustion (PFBC) plants, pressurized circulating fluidized-bed combustion (PCFBC) plants, or integrated gasification combined cycle (IGCC) plants, lower downstream component costs are projected, in addition to improved energy efficiency, lower maintenance, and elimination of additional expensive fuel or flue gas treatment systems. A critical component for the hot gas filter system is an effective fail-safe/regenerator device. This device shuts down individual filter element operation in the event of the failure of the element, gasket leaks or other events that would allow particulate matter to escape to the downstream components.

U.S. Patent Specification Nos. 5,185,019; 5,433,771 and 5,876,471 (Haldipur et al.; Bachovchin et al. and Lippert et al., respectively), teach improved gasket assemblies that can be employed with conventional or thin-walled ceramic candle filters. All three show separate holders/chambers for fail-safe regenerator units. Bachovchin et al. teach a combination of one top coarse mesh metal screen and five bottom coarse/fine mesh metal screens, in combination with a bed of particles, such as stainless steel Raschig rings, as shown in their FIG. 6. Fine screens trap particulate matter within the unit and prevent the collected particulate matter from being liberated during reverse cleaning pulsation. The Raschig rings form a thermal regenerator which heats pulses of cold gas during reverse flow cleaning, and the top coarse screen absorbs thermal shock during reverse pulse cleaning. In many instances, a fine mesh metal screen will also be used at the top the regenerator unit, supported by the coarse screen and the Raschig rings.

Lippert et al. in their FIG. 4 show another such fail-safe/regenerator device which is permanently mounted within a filter housing having associated gaskets, in contact with a ceramic candle filter. The fail-safe/regenerator device similarly prevents particulate matter from traveling into the clean gas area of the pressure vessel if a ceramic filter element fails. Additionally, U.S. Ser. No. 09/263,436, filed on Mar. 4, 1999, now U.S. Pat. No. 6,123,746, provided an improved rolled/layered gasket, with an optional fail-safe/regenerator, and described possible use of metallic filter elements having the same connection and configuration as standard ceramic candle filters, and U.S. Ser. No. 09/393,561, filed on Sep. 10, 1999 pending teaches an all metal filter configuration with reduced use of gaskets, and an integral filter fail-safe/regenerator device similar to Bachovchin et al.

While these inventions provide advances in the art, enhanced particulate capture capabilities beyond screens and Raschig rings are needed, as well as the ability of any new assembly to be retrofit into existing filter systems, and, even more efficient heat transfer is needed during filter cleaning operations. Also, it has been found that Raschig rings and the like do not automatically plug and prevent flow in the event of a failed filter as quickly and completely as desired. The ability of these devices to trap very fine particulates has been a particular problem. Also, a major limitation of the current fail-safe regenerator design, as shown in Bachovchin et al., is the longevity of the fine mesh screens. High temperature oxidation, corrosion, embrittlement and thermal shock are probably responsible for the deterioration of the fine mesh screens in a relatively short period of service (that is, about 1650 hours). Furthermore, flexing of the fine screens against the relatively coarse mesh support screen material may lead to tearing of the fine screens. The screens have been observed to develop 0.32 cm (⅛ inch) wide holes and, in some cases, to ultimately disintegrate (and probably flow downstream).

In U.S. patent application Ser. No. 4,976,934 (Maringer et al.), a non-static bed of continuously flowing fibers with aspect ratios between about 50 and 170, engaged in a nested relationship, is utilized to filter liquids and gases containing undesirable particulates. There, it was found that a fixed bed of metal or refractory nested fibers provided a filter effective initial zone where most particulates were captured with the rest of the bed being essentially wasted volume. The bed of the invention is moved downward, denested, cleaned of contaminating particulates, recycled to the top of the bed and renested. This continuous movement would seem to allow breakage of a substantial amount of the needle-line particles, reducing the overall aspect ratio requiring substantial replacement after several cycles. Maringer et al. suggest a high void volume, about 90% (minimum) to 96% porous (voids), 4% to 10% fibers, within the nested bed to increase dendritic capture of particles and reduce pressure drop. One example of use was catalytic cracking of high-boiling hydrocarbons to gasoline fractions at 500° C.

There is still a need to develop higher reliability filter configurations for use in advanced coalfired operation applications. There is also a need for improved thermal shock protection from incoming cold gas flowing into the filter elements during back pressure cleaning of the filter elements. Finally, it would be desirable that any improved filter assembly be able to substitute into existing systems in the field.

SUMMARY OF THE INVENTION

Therefore, it is a main object of this invention to provide an improved fail-safe/regenerator device having improved particle capture capability, which is resistant to sulfur, alkali, chlorides, steam and other contaminants found in coal gas streams, and which will quickly and thoroughly plug in a fail-safe situation. It is another object of this invention to provide an improved fail-safe/regenerator device which, when integrated in a high temperature filter system, provides improved reliability.

It is a further object to improve thermal shock resistance of the fail-safe/regenerator during cleaning operations and provide a design that can easily substitute into existing units.

These and other objects are accomplished by providing a filter assembly for filtering gas containing contaminating particulates, comprising a fail-safe/regenerator device and an elongated filter element, within a hot particulate gas cleanup system pressure vessel having a hot contaminated gas entry, said filter assembly comprising: a filter housing, said filter housing having a peripheral side wall, said side wall defining an interior chamber; a porous, elongated filter element body separated or attached to the bottom end of the fail-safe/regenerator device; and a one-piece fail-safe/regenerator device, having a top and bottom end, disposed within the interior chamber of the filter housing; said fail-safe/regenerator device comprising a 70% to 92% porous, rigid, static bed of generally interlocked and intertangled wires, the wires having an aspect ratio over about 30, with, optionally, at least some interlocking wires having an aspect ratio over 150, disposed between a top and bottom set of supports, said wires effective to trap contacting contaminating particulates permanently. The invention also resides in a device consisting essentially of a 80% to 92% porous, rigid, static bed of generally interlocked and intertangled wires, the wires having an aspect ratio between about 30 and 150, with a substantial amount of the interlocking wires having an aspect ratio over 190, disposed between a top and bottom set of supports, said wires effective to trap contacting contaminating particulates permanently. The device passes hot particulate-free gas in one direction and can also pass cold particulate-free gas for cleaning the static bed, said interlocked wires preheating the cold gas. The filter assembly is disposed or located between a contaminated feed gas source and a turbine apparatus, and the interlocked wires are disposed across, transverse, at a 90° angle, to the contaminated feed gas flow.

The ceramic or metal material of the needles must be effective at operating temperatures of over 1110° F. (600° C.) to bond contacting particulates to or within its structure. This fail-safe/regenerator device eliminates the use of Raschig rings and minimizes or eliminates the use of metal screens. The heat exchange, (regenerator) function of the Raschig rings is replaced with the wires, which have a 5 to 10× increased surface area. The interlocked wire fail-safe bed may be further refined by applying heat and/or pressure (sintering) to the bed of interlocked wires. Such additional processing would cause bonds between wires (metal to metal or oxide to oxide or coating to coating). Such bonding of the wires may be valuable in preventing individual wires from passing through the relatively large openings in the coarse mesh or perforated metal at the ends of the unit. The bed of wires would be static and permanently contained between the top and bottom mesh screens or perforated plates. A variety of compliant seals and gaskets can be used in a variety of combinations for sealing and holding the fail-safe/generator unit, and filter element.

The invention also envisions a complete emergency shut-down safety filter located in the clean gas stream, between the compressor-turbine generator apparatus and the filtering apparatus which contains the filter assembly. This safety filter will comprise a series of compartments containing similar interlocking wires transverse, at a 90° angle, to the clean gas flow. This provides an ultimate safety filter in case there is simultaneous major damage to a substantial number of the fail-safe/regenerator devices.

The interlocked wire (or fiber) fail-safe regenerator offers the following advantages over conventional designs: extended life of the unit, thermal shock resistance, more rapid pluggage of the unit, complete pluggage of the unit, and the pluggage of the unit is more resistant to backpulse recleaning.

BRIEF DESCRIPTION OF THE DRAWINGS

For a better understanding of the invention, reference may be made to the exemplary embodiments shown in the accompanying drawings, which.

DESCRIPTION OF THE PREFERRED EMBODIMENTS

Figure 1:
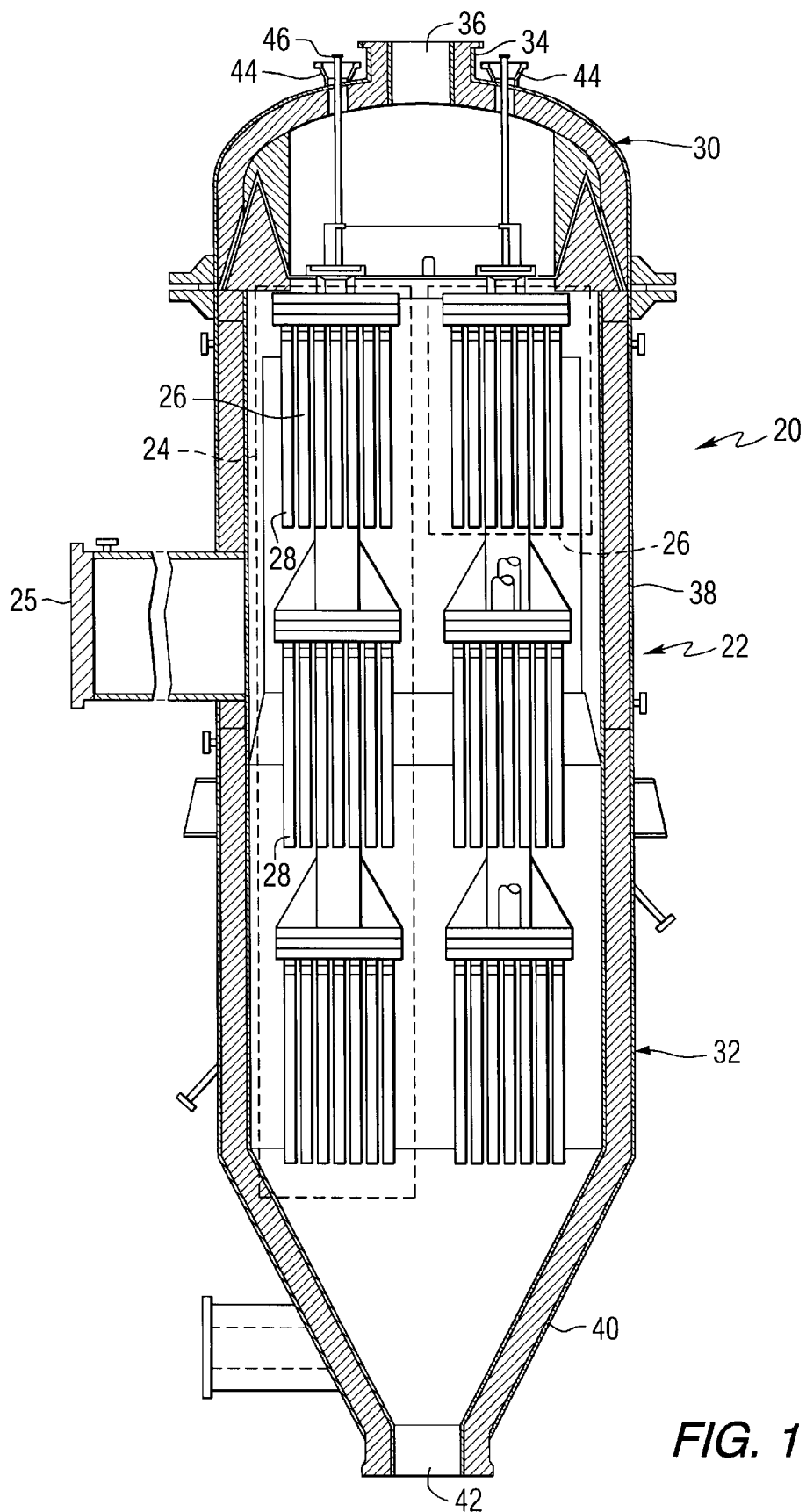
FIG. 1 is a longitudinal section view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of metallic, intermetallic and/or ceramic filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. The body 32 includes a dirty gas inlet 25, where gas enters at a temperature of from about 1110° F. (600° C.) to about 1830° F. (1000° C.). The body also contains an upper part 38 having a generally circular cylindrical shape joined by a frustoconical ash hopper 40 for receiving the particulate matter, terminating in a linear tip defining an opening or nozzle 42 connected to an ash discharge line. A plurality of ports 44 extend from the dome-shaped head 30. The ports 44 provide sites for inserting instrumentation, for viewing the interior of the dome-shaped head 30 during shut-down periods, and by way of tubes 46, for supplying a back pulse burst of gas for cleaning the filters 28.

Figure 2:
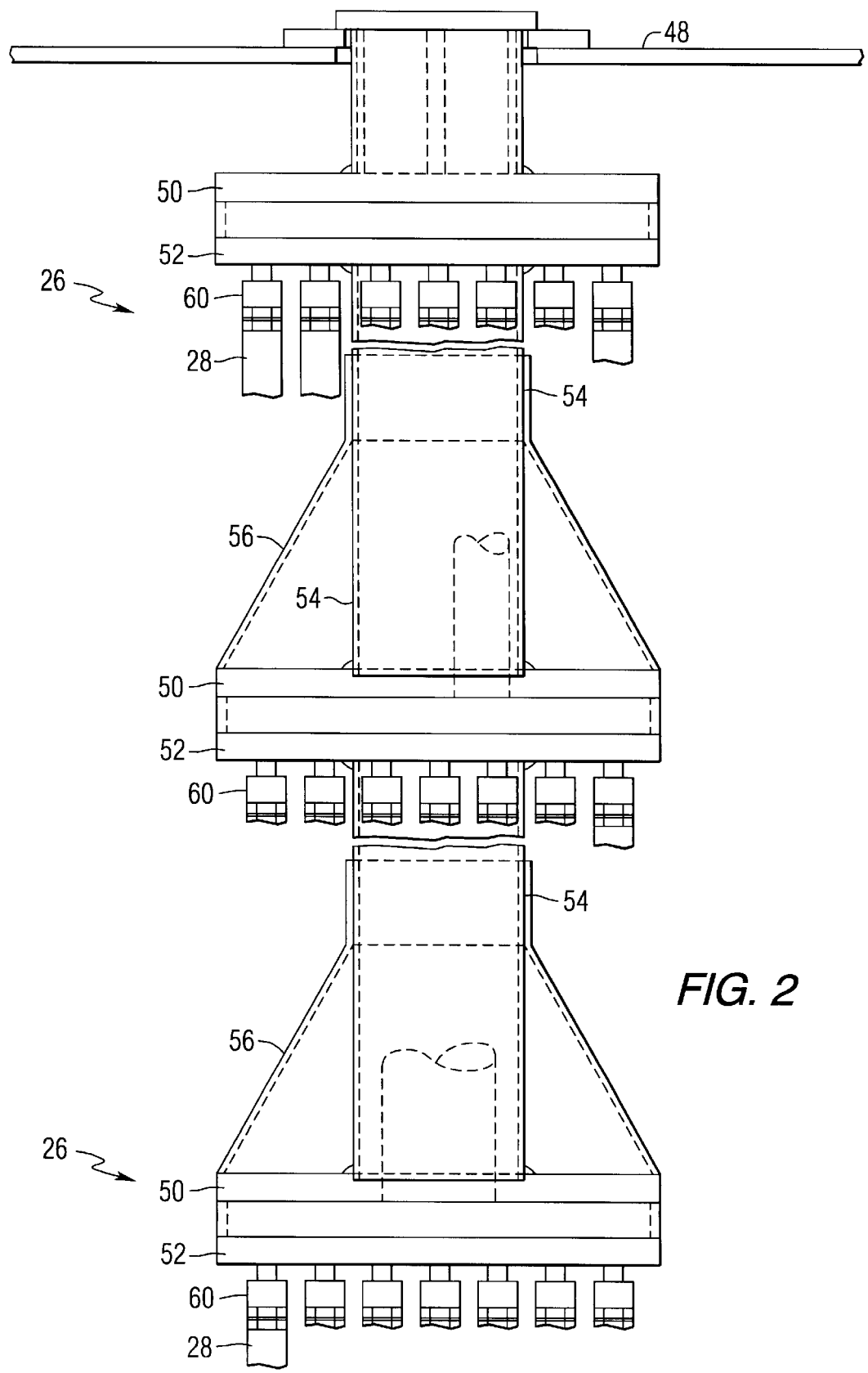
FIG. 2 is a side elevation view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each main filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frustoconical shape is also shown.

Prior experience has shown that oxidation of nonoxide-based ceramic monolithic, continuous fiber reinforced ceramic composites ("CFCC"), and reticulated foam ceramic matrices, has resulted when these materials are used in the construction of porous candle filter elements which experienced long-term field operation that is 500–3000 hours of pressurized fluidized-bed combustion ("PFBC"), or pressurized circulating fluidized-bed combustion ("PCFBC"). Similarly, oxide-based monoliths were shown to be susceptible to thermal fatigue and/or shock during process operation. Oxide-based CFCC and filament wound matrices were shown to have low strength semi-densified flanges; have low strength and load bearing filter bodies; have the potential for embrittlement of the contained CFCC fibers; and to possibly debond along inserted plugs, seams, applied membranes, component layers, and the like. As a result, recent efforts in the hot gas filtration technology have been directed to the development and assessment of the potential use of metal and intermetallic media in advanced coal-fired applications for both the candle filter or alternative filter configurations, and other components.

For use in advanced particulate filtration systems which are installed and operated in PFBC, PCFBC, IGCC, biomass and industrial applications, the porous ceramic, metal, or intermetallic filter elements should, advantageously, achieve particle collection efficiencies, pressure drop characteristics, and configuration and dimensional tolerances, as follows: particle collection efficiencies that are 99.999%; an initial pressure drop of less than or equal to 10 in-wg (inch-water gauge )/10 fpm (feet per minute); certification that the porous ceramic and/or metal media and/or weld materials will withstand oxidation and/or corrosive attack from high temperature process gas streams containing steam, gaseous sulfur, chlorides, and/or alkali species; and be capable of being pulse cleaned, removing ash from the filtration surface and returning to a lowered pressure drop. The preferred filter assembly 60 of the present invention is used with a fail-safe/regenerator device utilizing high aspect ratio inter-locked wires/fibers, providing tortuous, winding, irregular filter passageways which will now be described.

This invention describes a metal and/or ceramic, fail-safe/regenerator embodiment for capturing large and small particulates in the event of failure, damage, or breakage of the main candle filter during operation in advanced coal-based power systems, and/or biomass and industrial applications. In addition, said metal, fail-safe/regenerator device can be directly attached to metal and intermetallic filter elements, providing an integral unit, and facilitating ease of installation within existing filtration systems. These fail-safe/regenerator devices, shown in FIGS. 3 and 4, utilize a metal and/or ceramic highly "nested" wire/fiber mass which provides high surface area and superior particulate retention capabilities, to not only heat the pulse cleaning gas to mitigate thermal shock to itself and to the main porous monolithic ceramic, ceramic filament wound and/or continuous fiber ceramic composite (CFCC) candle or tube filters, as well as porous metal and/or intermetallic candle or tube filters, but also to assure prevention of the passage of particulate fines into the clean gas steam in the event of filter or gasket failure. They also protect downstream gas turbine and heat exchanger equipment, and maintain air pollution control emissions standards for plant operation.

These fail-safe/regenerator devices provide assembly for retrofit installation and/or placement within metal filter housings; assurance of mitigating particulate leak paths around the current and prior art filter flange, gaskets, and/or fail-safe/regenerator units; utilization with the porous monolithic ceramic, ceramic filament wound, and/or CFCC candle or tube filters, as well as porous metal and/or intermetallic candle or tube filter, and the like.

Figure 3:
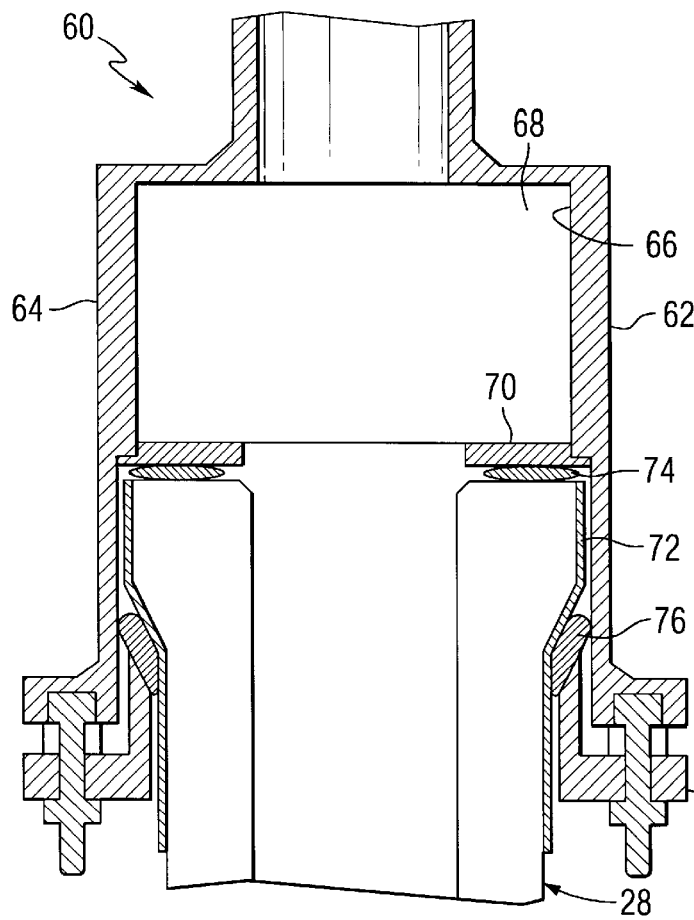
FIG. 3 is a sectional view of a filter holder and gasket assembly employed with a conventional monolithic thick-walled candle filter.

Referring to FIG. 3, one example of a filter assembly 60 is shown. The filter assembly 60 comprises a filter housing 62 having a peripheral side wall 64 which defines an interior chamber 66, a fail-safe/regenerator device 68, shown in detail in FIG. 4, mounted within the interior chamber 66, an annular spacer ring 70 mounted within the interior chamber 66, a gasket sock or sleeve 72, a top compliant gasket 74, a middle compliant cushion 76, and a cast nut 78.

Preferably, the spacer ring 70 is permanently mounted to the fail-safe/regenerator to produce a single unit that is placed within the interior chamber 66 of the filter housing. In this case, the spacer ring 70 may be welded in abutment with the fail-safe/regenerator device 68 to secure the fail-safe/regenerator 68 unit and to prevent the filter element 28 from moving and contacting the filter housing 62, thereby preventing possible damage to the main filter element 28. The fail-safe/regenerator device 68 is provided to prevent particulate matter from travelling into the clean gas area of the pressure vessel if a filter element fails, is damaged or breaks. Additionally, the fail-safe/regenerator 68 will heat the back pulsed gas which is generally cooler than the gas stream to prevent the filter elements 28 from enduring thermal fatigue or cracking.

Figure 4:
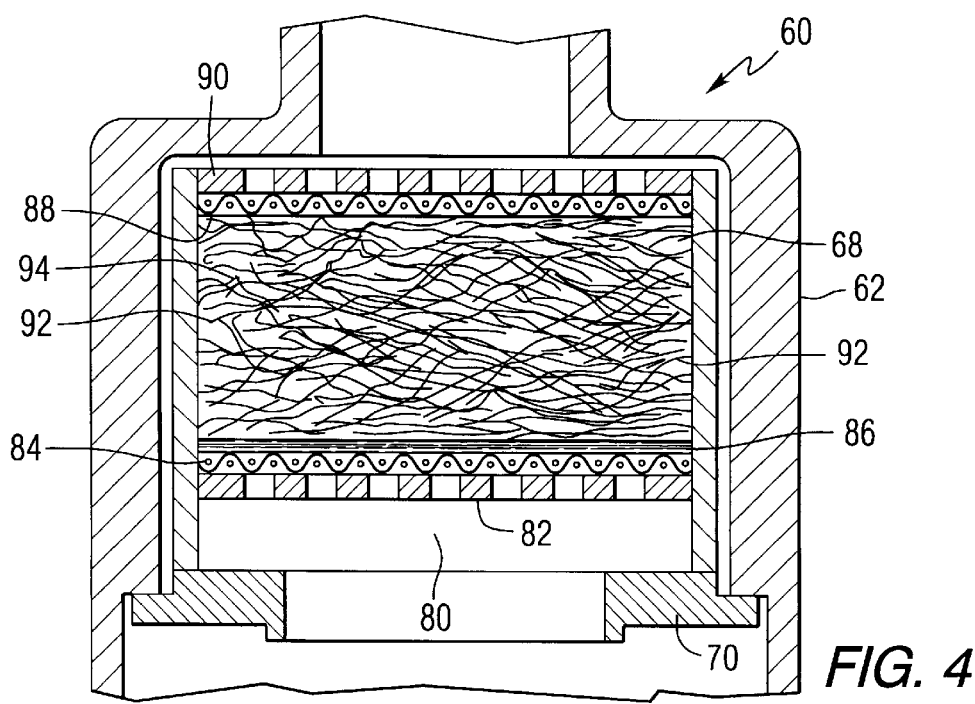
FIG. 4, which best describes the invention, details one embodiment of the interlocked fiber fail-safe regenerator of this invention.

A preferred embodiment of a filter assembly 60 is shown in FIG. 4, wherein the back-up fail-safe/regenerator device 68 is shown. A gap 80 is usually provided between a spacer ring 70 and a bottom perforated main metal plate support 82 which supports the back-up safeguard above the gap. The gap 80 allows for distribution of the gas over the surface area of the back up fail-safe/regenerator device 68. The preferred back-up fail-safe/regenerator device can usually comprise the following metal support layers on top of support 82: a first bottom coarse screen 84, a first bottom optional fine screen 86, a second top coarse screen 88, and a top main perforated metal plate support 90. The wires 92, which are defined to include the terms needles or fibers, will have an aspect ratio (length/diameter) over about 30, with, optionally, at least some (defined as over about 10% by weight and up to about 80% by weight) interlocked wires having an aspect ratio over about 150, and preferably between 90 and 2000, such that they are locked and inter-tangled. Most preferably, a substantial amount (over 20% by weight) of the interlocked wires have an aspect ratio over about 190 to provide a rigid, static mass of about 70% to 92% porosity or voidage, (8% to 30% theoretical density), preferably from 80% to 92%. A very useful aspect range is 30 to 150, with a substantial amount of the interlocked wires having an aspect ratio over about 190. Even if a number of wires break at the top of the bed, for example during back pressure cleaning, the intertangled arrangement is preserved and their function is maintained. By utilizing at least some very long wires having aspect ratios over 150, the entire mat is integrated into a unitary structure, especially if crossover points are sintered.

The wires, needles or fibers 92 are generally transverse, at a 90° angle, to the contaminated gas feed flow and have many crossover points 94 to make the mass unitized and further improve rigidity. They may be heat and/or pressure sintered together at crossover points to provide bonding across the interfaces. As shown in FIG. 4, the fibers have some substantially parallel, horizontal arrangement in the top to bottom arrangement. They are disposed for non-movement. This provides better cross-section for dust entrapment. The needles are selected from the group consisting of metal or ceramic and mixtures thereof. Nickel fibers provide good entanglement and upon sintering provide interlocking melt globules and a "steelwool-like" mat. Stainless steel can also be used. Ceramic fibers, for example mullite ($3Al_2O_3 \cdot 2SiO_2$), alumina, zirconia and silica (if available), could also provide good intermeshing and oxide to oxide bonds at sintering. Sintering is also advantageous in preventing individual fibers from passing through the relatively large openings of the containing, coarse, porous mesh or perforated metal supports 82 and 90. Generally, the fibers can have lengths of 10 mm to 250 mm and diameters of about 0.08 mm to 0.5 mm.

The static bed of this invention takes advantage of a shortcoming of the true nested fiber continuous filter concept shown in Maringer et al. That is, nested fibers are usually difficult to clean and therefore cannot be readily reused in a recirculating process filter. This "problem" is an advantage for the fail-safe regenerator device of this invention, because it is desirable that the bed of this invention plug quickly, completely, and resist unplugging during backpulsing. The interlocked, static fiber bed of this invention is inherently resilient to degradation due to thermal shock. That is, while fine mesh at the downstream end of conventional fail-safe regenerators would be exposed to the full thermal impact of a backpulse, only the top of the bed of interlocked fibers would experience such shock. To the extent that the fibers are an effective regenerator, there would be progressively less shock from the top to the bottom of the bed. Also, as shown in FIG. 4, retrofit application to existing hot gas filter design, such as that of Bachovchin et al., could be as simple as replacing the fine mesh and Raschig ring media of existing fail-safe regenerators with this interlocked fiber design. In such a configuration, the fibers could also perform the function of the Raschig ring media as a heat exchanger to protect the filter from thermal shock during backpulsing. In fact, one would expect the greater surface area of nested fibers to offer a heat exchange advantage versus Raschig rings.

Figure 5:
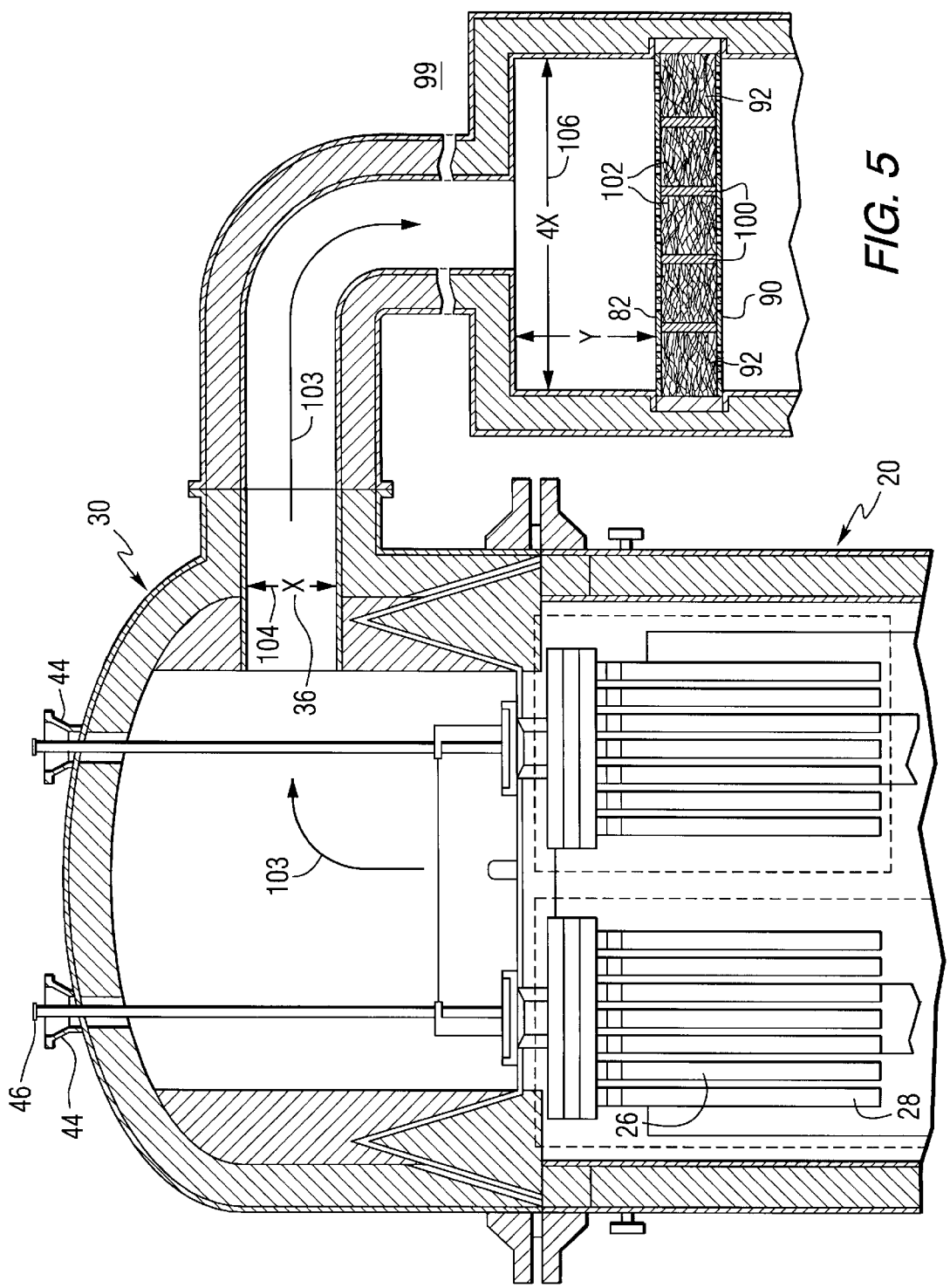
FIG. 5 shows one embodiment of the downstream safety filter, with interlocking wires positioned transverse, at a 90° angle, to the clean gas flow, placed in the gas stream before the compressors and turbine generators.

FIG. 5 illustrates one embodiment of an additional, downstream associated safety filter apparatus 99, located between the filtering apparatus 20 (in FIG. 1) and the turbine apparatus which contains heat exchangers, compressors and gas turbine generators. This operates as a last chance safety device if there is massive failure of a substantial number of tube filters and fail-safe/regenerator devices. The safety filter is connected to exit nozzle 36, which is located at the side in this embodiment, rather than at the top of the filtering apparatus 20. If the inside diameter 104 of the exit nozzle 36 is ×cm, then the inside diameter of the safety filter will preferably be from 3× to 5×cm, most preferably 4×cm (as shown). The safety filter comprises a plurality of compartments 102, each containing a 70% to 92% porous, rigid, static bed of generally interlocked wires 92, with crossover contact points, having an aspect ratio over about 30, with, optionally, at least some interlocked wires having an aspect ratio over about 150, disposed between top and bottom sets of porous, usually perforated metal supports 82 and 90.

A number of internal supports 100, to make the filter 99 rigid, are shown between supports 82 and 90. The interlocked wires have preferred porosities and dimensions, as described previously, and are preferably sintered at their contact points to further insure the rigidity needed because of the large diameter of the filter 99. The interlocked wires must be generally transverse, at a 90° angle, to the clean gas flow 103, which will be in a downward direction at contact with the safety filter 99, and to the force of gravity, otherwise the particles would collect on top of the support walls 100, allowing through gas flow. A substantial distance Y between the compartments 102 and the influx of gas into the safety filter 99 is allowed, to provide an effective length for expanding gas flow 103 to contact all, rather than just the central, compartments.

The interlocked mat bed of this invention is a static "circuit breaker" designed to stop all flow passively in the event of a main filter element breakage. The fibers do not move. In fact, while a continuous nested fiber filter arrangement must have relatively low density, unentangled fibers to enhance their ability to flow, the interlocked fiber fail-safe of this invention must preserve the static, tangled bed of fibers. This is accomplished by capturing the bed with a mesh blanket at the top and bottom, optionally sintering the fibers into a unified mass and by using high aspect ratio fibers that can be entangled into a "steel-wool-like" pad that will not lose its integrity in flowing gas or during a backpulse. By comparison, a nested fiber filter would utilize low aspect ratio fibers, usually 60 to 1, to be able to circulate them, while an interlocked fiber fail-safe could take advantage of entanglement using at least some, or a substantial amount of, high aspect ratio fibers of about 150–2000 to 1.

EXAMPLE

A mass of steel fibers having the composition of Type 316 stainless steel, a length of approximately 16 mm and a diameter of approximately 0.5 mm, providing an aspect ratio of about 32 to 1 was pressed to an intertangled mass in mat form. This mat, which was about 92% porous, was then placed in a container to simulate operation as a fail-safe/regenerator device in a filter assembly for filtering hot gas. A hot gas (1550° F.) 850° C. and a coarse ash (Tidd) particulate stream were fed through the unit to simulate operation in a hot broken filter configuration with backpulsing. System pressure was 120 psig, inlet dust loading was 4400 ppm, face velocity was 5 ft/min (1.52 m/min.) and backpulse pressure was 265 psig. The fail-safe performed well, that is, it jammed relatively quickly, stopped all particulate flow and did not unplug during backpulsing.

The present invention may be embodied in other forms without departing from the spirit or essential attributes thereof, and accordingly, reference should be made to both the appended claims and the foregoing specification as indicating the scope of the invention.

What is claimed is:

1. A filter assembly for filtering gas containing contaminating particulates, comprising a fail-safe/regenerator device and an elongated filter element, within a hot gas cleanup system pressure vessel having a hot particulate contaminated gas entry, said filter assembly comprising: a filter housing, said filter housing having a peripheral side wall, said side wall defining an interior chamber; a porous, elongated filter element body attached to the bottom end of the fail-safe/regenerator device; and a one-piece, fail-safe/regenerator device, having a top and bottom end, disposed within the interior chamber of the filter housing, said fail-safe/regenerator device comprising: a 70% to 92% porous, rigid, static bed of generally interlocked wires, the wires having an aspect ratio over about 30, with, optionally, at least some interlocked wires having an aspect ratio over about 150, disposed between a top and bottom set of supports, said wires effective to trap contacting contaminating particulates permanently.

2. The filter assembly of claim 1, wherein the interlocked wires of the fail-safe/regenerator device are disposed between two metal supports.

3. The filter assembly of claim 1, wherein the interlocked wires of the fail-safe/regenerator device are disposed for non-movement within the fail-safe/regenerator device.

4. The filter assembly of claim 1, wherein the interlocked wires of the fail-safe/regenerator device have an aspect ratio between 30 and 150, with, optionally, a substantial amount of the interlocked wires having an aspect ratio over 190.

5. The filter assembly of claim 1, wherein the interlocked wires of the fail-safe/regenerator device have an aspect ratio between 90 and 2000.

6. The filter assembly of claim 1, wherein the interlocked wires of the fail-safe/regenerator device have many crossover points within the bed.

7. The filter assembly of claim 1, wherein the interlocked wires of the fail-safe/regenerator device are selected from the group consisting of metal or ceramic, and mixtures thereof.

8. The filter assembly of claim 1, wherein the interlocked wires of the fail-safe/regenerator device have many crossover points within the bed and the interlocked wires are sintered together at the crossover points.

9. The filter assembly of claim 1, wherein the interlocked wires of the fail-safe/regenerator device provide a bed having a porosity from about 80% to 92%.

10. The filter assembly of claim 1, wherein the interlocked wires are metal.

11. The filter assembly of claim 1, wherein the interlocked wires are ceramic.

12. The filter assembly of claim 1, operating in an environment of hot, particulate contaminated gas flow and entry within a hot gas cleanup system pressure vessel, disposed in a filtering apparatus between a contaminated feed gas source and a turbine apparatus.

13. The filter assembly of claim 12, wherein the fail-safe/regenerator device passes hot particulate-free gas in one direction and can also pass cold particulate-free gas for cleaning the static bed, said interlocked wires preheating the cold gas.

14. The filter assembly of claim 1, also having an associated downstream filter, comprising a plurality of compartments, each compartment containing a 70% to 92% porous, rigid, static bed of generally interlocked wires, the wires having an aspect ratio over about 30, with, optionally, at lease some interlocked wires having an aspect ratio over about 150, disposed between a top and bottom set of porous supports.

15. The filter of claim 14, wherein the interlocked wires have an aspect ratio between 30 and 150, with, optionally, a substantial amount of the interlocked wires having an aspect ratio over 190.

16. The filter assembly of claim 14, wherein the interlocked wires are sintered together.

* * * * *